(12) United States Patent
Di Sciullo et al.

(10) Patent No.: US 9,940,672 B2
(45) Date of Patent: Apr. 10, 2018

(54) SYSTEM FOR GENERATING DATA FROM SOCIAL MEDIA MESSAGES FOR THE REAL-TIME EVALUATION OF PUBLICLY TRADED ASSETS

(75) Inventors: Anna Maria Di Sciullo, Montreal (CA); Alex Karakozoff, McLean, VA (US); Gautham Sastri, Miami Beach, FL (US)

(73) Assignee: ISENTIUM, LLC, Miami, FL (US)

( * ) Notice: Subject to any disclaimer, the term of this patent is extended or adjusted under 35 U.S.C. 154(b) by 559 days.

(21) Appl. No.: 13/427,819

(22) Filed: Mar. 22, 2012

(65) Prior Publication Data
US 2012/0324023 A1    Dec. 20, 2012

Related U.S. Application Data

(60) Provisional application No. 61/466,067, filed on Mar. 22, 2011.

(51) Int. Cl.
*G06F 15/16* (2006.01)
*G06Q 40/06* (2012.01)
*G06Q 10/04* (2012.01)
*G06Q 30/02* (2012.01)
*G06Q 50/00* (2012.01)

(52) U.S. Cl.
CPC ............ *G06Q 40/06* (2013.01); *G06Q 10/04* (2013.01); *G06Q 30/0201* (2013.01); *G06Q 30/0202* (2013.01); *G06Q 50/01* (2013.01)

(58) Field of Classification Search
CPC .... G06F 17/2755; G06Q 10/06; G06Q 30/02; G06Q 30/0269; G06Q 40/06; G06Q 10/04; G06Q 30/0201; G06Q 30/0202; G06Q 50/01; H04N 21/234336

USPC .............. 707/2, 3, 706, 723, 748, 740, 754; 705/14.49, 35; 704/9, 2; 709/206–209; 715/744; 706/20
See application file for complete search history.

(56) References Cited

U.S. PATENT DOCUMENTS 6,671,683 B2    12/2003  Kanno
7,523,085 B2    4/2009   Nigam et al.
(Continued)

OTHER PUBLICATIONS

"MorphAdorner—A Java Library for the Morphological Adornment of English Language Texts", Northwestern University, 2007.
(Continued)

*Primary Examiner* — Dustin Nguyen
(74) *Attorney, Agent, or Firm* — Welsh Flaxman & Gitler LLC

(57) ABSTRACT

A system for generating data from social media messages for the real-time evaluation of publicly traded assets includes an ingest component for ingesting the social media messages and a filter module eliminating expressions not considered useful language from social media messages and configuring input social media message into useful formats to form filtered social media messages. The system also includes a language processor processing the filtered social media messages based upon lexical databases to form filter and processed social media messages. The system further includes a sentiment calculator applying rules to the filtered and processed social media messages so as to compute a representation of sentiment values associated with the social media messages. A graphical user interface displaying the sentiment values is also provided.

18 Claims, 8 Drawing Sheets

(56) References Cited

U.S. PATENT DOCUMENTS

| | | | |
|---|---|---|---|
| 7,600,017 B2 | 10/2009 | Holtzman et al. | |
| 7,715,631 B2 | 5/2010 | Tanaka et al. | |
| 7,734,641 B2 | 6/2010 | Kanigsberg et al. | |
| 7,865,354 B2 | 1/2011 | Chitrapura et al. | |
| 7,930,302 B2 | 4/2011 | Bandaru et al. | |
| 7,966,241 B2 | 6/2011 | Nosegbe | |
| 7,987,188 B2 | 7/2011 | Neylon et al. | |
| 7,996,210 B2 | 8/2011 | Godbole et al. | |
| 8,010,539 B2 | 8/2011 | Blair-Goldensohn et al. | |
| 8,078,450 B2* | 12/2011 | Anisimovich | G06F 17/2755 704/2 |
| 8,239,189 B2 | 8/2012 | Skubacz et al. | |
| 8,281,238 B2 | 10/2012 | Sweeney et al. | |
| 8,463,594 B2 | 6/2013 | Au | |
| 8,645,395 B2 | 2/2014 | Mushtaq et al. | |
| 9,092,421 B2 | 7/2015 | Chowdhury et al. | |
| 2002/0196679 A1* | 12/2002 | Lavi et al. | 365/200 |
| 2003/0135445 A1 | 7/2003 | Herz et al. | |
| 2006/0242040 A1* | 10/2006 | Rader | G06Q 40/06 705/35 |
| 2007/0005477 A1 | 1/2007 | McAtamney | |
| 2007/0005564 A1* | 1/2007 | Zehner | 707/2 |
| 2008/0133488 A1* | 6/2008 | Bandaru et al. | 707/3 |
| 2008/0249764 A1 | 10/2008 | Huang et al. | |
| 2008/0270116 A1* | 10/2008 | Godbole et al. | 704/9 |
| 2008/0319924 A1 | 12/2008 | Nosegbe | |
| 2010/0121707 A1* | 5/2010 | Goeldi | 705/14.49 |
| 2010/0262454 A1* | 10/2010 | Sommer | G06Q 30/02 706/20 |
| 2010/0275128 A1* | 10/2010 | Ward | G06Q 10/06 715/744 |
| 2010/0312769 A1* | 12/2010 | Bailey et al. | 707/740 |
| 2010/0325107 A1* | 12/2010 | Kenton et al. | 707/723 |
| 2010/0332465 A1 | 12/2010 | Janssens et al. | |
| 2011/0055186 A1* | 3/2011 | Gopalakrishnan | 707/706 |
| 2011/0137906 A1 | 6/2011 | Cai et al. | |
| 2011/0225174 A1 | 9/2011 | Artzt et al. | |
| 2011/0238674 A1 | 9/2011 | Avner et al. | |
| 2011/0246179 A1 | 10/2011 | O'Neil | |
| 2011/0246921 A1 | 10/2011 | Mercuri et al. | |
| 2011/0251977 A1 | 10/2011 | Cialowicz et al. | |
| 2011/0252036 A1 | 10/2011 | Neylon et al. | |
| 2011/0258256 A1 | 10/2011 | Huberman et al. | |
| 2011/0282860 A1 | 11/2011 | Baarman et al. | |
| 2011/0302006 A1 | 12/2011 | Avner et al. | |
| 2011/0302106 A1 | 12/2011 | Nosegbe | |
| 2011/0320542 A1 | 12/2011 | Bendel et al. | |
| 2012/0011158 A1 | 1/2012 | Avner et al. | |
| 2012/0101808 A1 | 4/2012 | Duong-Van | |
| 2012/0150972 A1 | 6/2012 | Morris et al. | |
| 2012/0191730 A1* | 7/2012 | Parikh et al. | 707/754 |
| 2012/0272160 A1* | 10/2012 | Spivack | G06Q 10/10 715/752 |
| 2012/0291070 A1* | 11/2012 | Feng | H04N 21/23433 725/40 |
| 2012/0296845 A1* | 11/2012 | Andrews | G06Q 40/06 705/36 R |
| 2012/0330973 A1* | 12/2012 | Ghuneim et al. | 707/748 |
| 2014/0207579 A1* | 7/2014 | LeBrun | G06Q 30/0269 705/14.66 |

OTHER PUBLICATIONS

Pang, B., et al., "Thumbs Up? Sentiment Classification Using Machine Learning Techniques", Proceedings of the Conference on EMNLP, Philadelphia, Jul. 2002, pp. 79-86.

* cited by examiner

SYSTEM FOR GENERATING DATA FROM SOCIAL MEDIA MESSAGES FOR THE REAL-TIME EVALUATION OF PUBLICLY TRADED ASSETS

CROSS REFERENCE TO RELATED APPLICATION

This application claims the benefit of U.S. Provisional Patent Application Ser. No. 61/466,067, entitled "METHOD AND SYSTEM USING SOCIAL MEDIA FOR REAL-TIME EVENT DRIVEN TRADING", filed Mar. 22, 2011.

BACKGROUND OF THE INVENTION

1. Field of the Invention

The present invention relates a method and system using social media for real-time event driven trading of equities, commodities and other traded assets.

2. Description of the Related Art

Sentiment analysis applies various analytical techniques in identifying subjective information from different information sources. Sentiment analysis, therefore, attempts to ascertain the feelings, thoughts, attitude, opinion, etc. of a speaker or a writer with respect to a topic.

Most work on sentiment analysis has relied on two main approaches. The first approach, in particular, a so called "bag of words" approach, attempts to apply a positive/negative document classifier based on occurrence frequencies of the various words in a document. Applying this approach various learning methods can be used to select or weight different parts of the text used in the classification process. This approach fails to process the sentiment with respect to assets (for example, equities or commodities) in short digital messages such as tweets sent via the online social networking service Twitter.

The second approach is "semantic orientation." Semantic orientation automatically classifies words into two classes, "good" and "bad", and then computes an overall good/bad score for the text. This method does not take into consideration the sentiment conveyed by parts of speech other than adjectives, including verbs, for example, to bounce, to crash, nouns, for example, a put, a call, and phrases, for example, ascending triangle, black Friday, head-and-shoulders.

Both methods fail to determine the sentiment with respect to specific assets in short digital messages such as tweets sent via the online social networking service Twitter. Their main pitfall is that they fail to process the sentiment in the syntax-semantic context of the message.

SUMMARY OF THE INVENTION

It is, therefore, an object of the present invention to provide a system for generating data from social media messages for the real-time evaluation of publicly traded assets. The system includes an ingest component for ingesting the social media messages and a filter module eliminating expressions not considered useful language from social media messages and configuring input social media message into useful formats to form filtered social media messages. The system also includes a language processor processing the filtered social media messages based upon lexical databases to form filter and processed social media messages. The system further includes a sentiment calculator applying rules to the filtered and processed social media messages so as to compute a representation of sentiment values associated with the social media messages. A graphical user interface displaying the sentiment values is also provided.

It is also an object of the present invention to provide a system wherein the ingest component acquires social media messages on the basis of keywords or a combination of keywords the ingest component has been programmed to look for.

It is another object of the present invention to provide a system including a language identifier positioned after the ingest component for determining the language used in the social media messages prior to the filter module.

It is a further object of the present invention to provide a system wherein the filter module eliminates URLs and hash tags from the social media messages.

It is also an object of the present invention to provide a system wherein the assets are equities or commodities.

It is another object of the present invention to provide a system wherein the language processor includes a sentiment-based repository of frequent lexical items.

It is a further object of the present invention to provide a system wherein the lexical items are associated with polarity values and strength values.

It is also an object of the present invention to provide a system wherein the polarity values are positive, negative and neutral.

It is another object of the present invention to provide a system wherein the strength values associated with the lexical items range from at least 1 to 3, where 1 is the lowest value and 3 is the highest value.

It is also an object of the present invention to provide a system wherein the language processor includes a stock-based lexical repository composed of lexical items used in the ingested social media messages, as well as lexical items used in stock exchange and financial news wire.

It is another object of the present invention to provide a system wherein the lexical items of the stock-based lexical repository are associated with polarity values and strength values.

It is a further object of the present invention to provide a system wherein the polarity values of the lexical items of the stock-based lexical repository are positive, negative and neutral.

It is also an object of the present invention to provide a system wherein the strength values associated with the lexical items of the stock-based lexical repository ranges from at least 1 to 3, where 1 is the lowest value and 3 is the highest value.

It is another object of the present invention to provide a system wherein the language processor includes a POS tagger.

It is a further object of the present invention to provide a system wherein the language processor includes a parser.

It is also an object of the present invention to provide a system wherein a sentiment is an integer computed based upon pairs of lexical items in local syntactic context.

It is another object of the present invention to provide a system wherein the sentiment calculator includes means for determining lexical polarity in social media messages.

It is a further object of the present invention to provide a system wherein the sentiment calculator includes means for determining a strength value of lexical items used in social media messages.

It is also an object of the present invention to provide a system including an inference engine attempting to provide an answer to a problem, or clarifying uncertainties.

It is another object of the present invention to provide a system wherein the inference engine includes a data structure, a knowledge base that uses some knowledge representation structure to capture the knowledge of a specific domain, and a set of inference rules applying to the entities in the relational table and drawing consequences.

It is a further object of the present invention to provide a system wherein the language processor includes a lemmatizer.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 5 is a screen shot showing the ingest and processing of various assets.

DESCRIPTION OF THE PREFERRED EMBODIMENT

Figure 1:
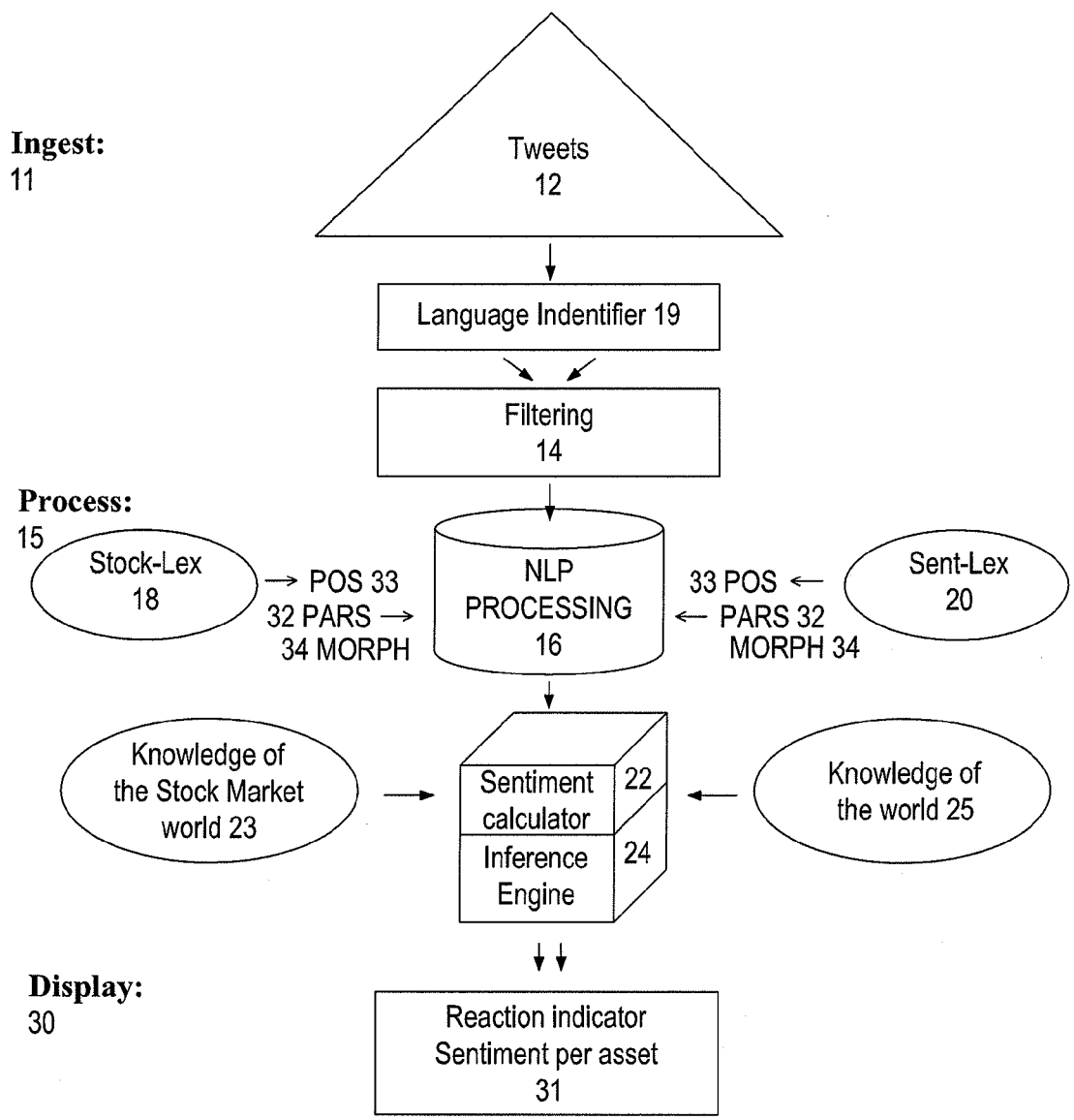
FIG. 1 is a schematic overview of the present system.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to FIGS. 1 to 7, a method and system using social media for event-driven trading are disclosed. The present method and system 10 use social media for the real-time evaluation of publicly traded assets, in particular, equities and commodities, using information generated through social media interactions. For example, and with reference to FIG. 5, a series of "tweets" (social comments transmitted using the social networking service Twitter) are shown. As used herein an "asset" is considered to be a resource with economic value that an individual, corporation or country owns or controls with the expectation that it will provide future benefit. Assets include, but not limited to investments in equities, options, derivatives, commodities, bonds, futures, currencies, etc. It should further be appreciated that "equities" are stocks or any other securities representing an ownership interest.

It is appreciated the following discloses the present method and system 10 with reference to the stock market, although the application of the present invention could be extended to commodities and other asset based markets. By monitoring publicly available social media information, the present system 10 is able to effectively predict swings in asset prices for effective and profitable trading thereof.

As will be appreciated based upon the following disclosure, the present method and system 10 provide a sentiment calculator 22 that employs natural language processing in evaluating social media interactions by anticipating the sentiment of traders relating to specific equities and commodities in terms of the polarity of the sentiment and the strength of the sentiment. The data generated by the sentiment calculator 22 is applied to a reaction indicator 31 in the form of a graphical user interface 30 that combines sentiment and frequency (which is indicative of the intensity of the sentiment) data relating to the assets. Once sentiment and frequency are fully appreciated, the present system 10 and method provide a mechanism for cross-correlating the sentiment and intensity data (the perceived strength of the sentiment being expressed by the social media) with the actual fluctuations occurring with the price of assets.

Briefly, and in accordance with a preferred implementation of the present invention, the present system 10 provides for the processing of social media messages generating data for the real-time evaluation of publicly traded assets, for example, stocks. The system 10 includes an ingest component 11 for ingesting the social media messages; a filter module 14 eliminating expressions not considered useful language from social media messages; a natural language processor (NLP) 16 processing filtered social media messages; a sentiment calculator 22 applying rules to the filtered and NLP processed social media messages so as to compute a representation of values associated with the filtered and NLP processed social media messages; and a graphical user interface 30 displaying the values generated by the sentiment calculator 22.

With reference to FIG. 1, the ingest component 11 consumes, acquires or gathers a wide range of social media messages 12 and immediately filters the messages as will be explained below in greater detail. The ingest component 11 is a data acquisition module. The ingest component 11 allows the system 10 to automatically import raw social media messages, for example, tweets from Twitter or other social media sites. The data, that is, the raw social media messages, is acquired on the basis of a predefined set of keywords or combination of keywords the system 10 has been programmed to look for. The filtered social media messages are then subjected to natural language processing via NLP module 16 based upon lexical databases 18, 20 of both stock specific sentiment terminology (Stock-Lex 18) and general, non-stock specific, sentiment terminology (Sent-Lex 20). The filtered and NLP processed social media messages are next processed by the sentiment calculator 22 and inference engine 24. The sentiment calculator 22 and inference engine 24 apply information from databases 26, 28 respectively relating to the knowledge of the stock market world and the knowledge of the world. The results of the sentiment calculator 22 and inference engine 24 are then presented to the user via a reaction indicator 31 in the form of a graphical user interface upon a computer monitor which displays sentiment per asset information.

Sentiment Calculation

As discussed above, sentiment calculation is part of the present system 10 for event-driven trading using social media messages. As described above, the system 10 ingests content (that is, social media messages such as tweets) from one or multiple social media sources based on user-specified criteria. The meaning of the information conveyed by the social media messages is determined using a natural language processing (NLP) module 16. The system 10 then calculates "sentiment" and presents metrics relating thereto in real-time.

Figure 5:
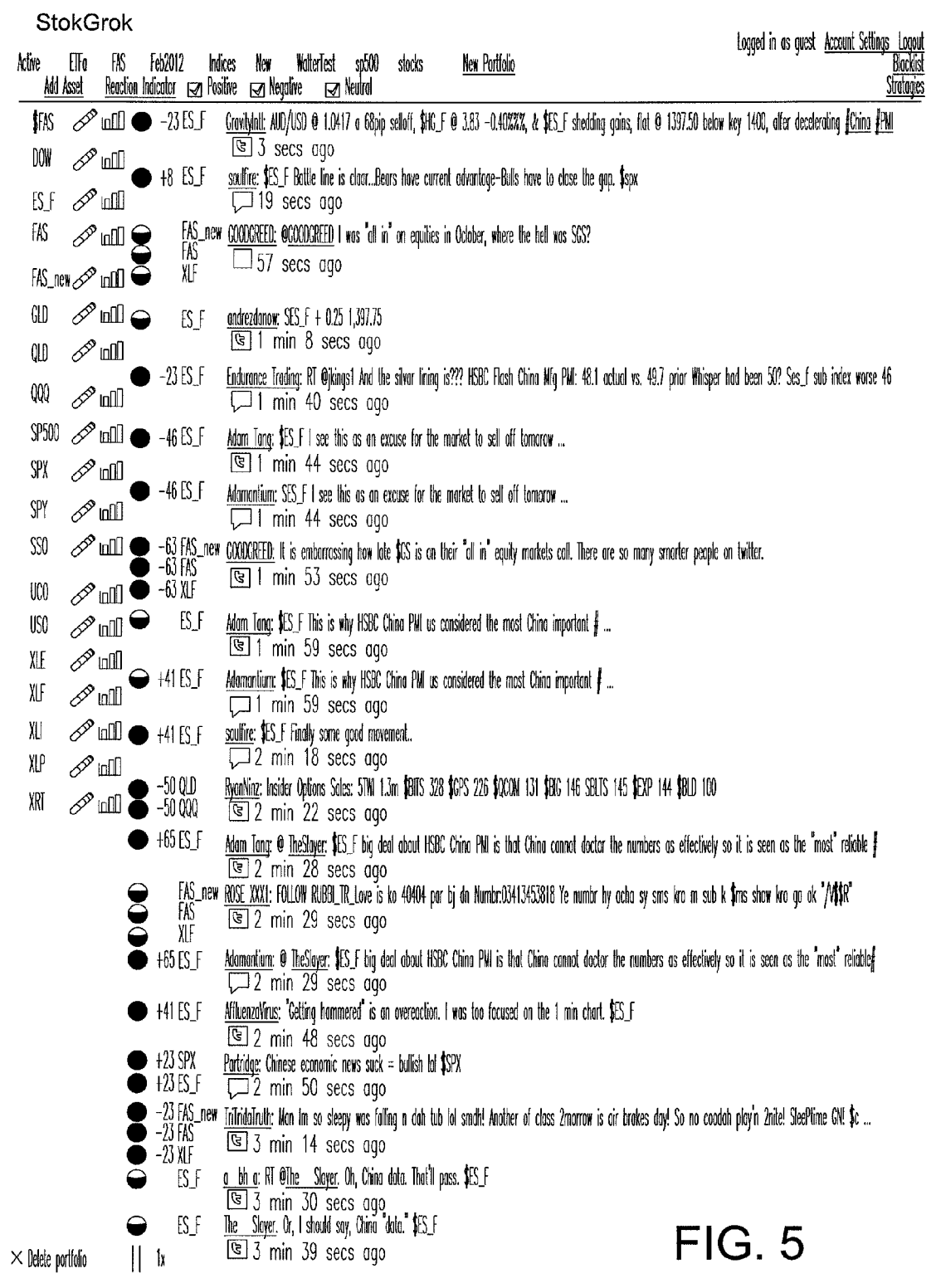

FIG. 5 shows social media messages, for example, "tweets", with annotations relating to the sentiment scoring for the individual tweets. In this way, sentiment calculations in accordance with the present invention may be used to anticipate the reaction of the traders before they act.

In accordance with a preferred embodiment, the sentiment calculator 22 of the present system 10 analyzes social media messages to calculate the sentiment with respect to events pertaining to objects. Objects relate to assets being traded, via situations having a bearing on public sentiment and relating the value of the asset being traded (preferably on an exchange). It should be appreciated "object(s)" refers to anything related to an asset that can be publically traded and monitored. For example, an "iphone" and the stock symbol "AAPL" are objects which relates to the asset Apple Inc. which can be publically traded.

The sentiment calculator 22 represents one module of the present multilayered system 10 for processing short and noisy messages such as tweets, as depicted in the schematic shown in FIG. 1. Proper operation of the sentiment calculator 22, that is, sentiment calculations, requires that a filter module 14 configure input text into formats for use by the subsequent processing modules of the pipeline making up the present invention. The filter module 14 is composed of a set of rules (using regular expressions) created to transform the ingested social media messages into expressions without noise. Noise is considered to be elements in the message which are not part of natural language, such as hash tags, URLs, etc. Therefore, the filter module 14 functions to bring tweets as close as possible to expressions in natural language by eliminating expressions that are not considered part of current language usage. For example, the filter module 14 eliminates URLs and hash tags at the periphery of the tweet, normalizes symbols and abbreviations, for example "q1|1q|1$^{st}$ quarter|" is replaced by "first quarter". Basically, the filter module 14 eliminates noisy elements from the data being ingested, such as URLs and hash tags so that it may be further processed by the NLP module 16.

Once filtered, the ingested social media messages are then sent to NLP module 16 for further processing. Sentiment calculations in accordance with the present invention require that a Part of Speech (POS) Tagger 33 assign lexical categories to each of the filtered social media messages as they are broken into a stream of text, words, phrases, symbols, or other meaningful elements called tokens, that is, tokenized messages. Sentiment calculations in accordance with the present invention also require that a partial parser (PARS) 32 recover the structure of the main constituents/syntactic structures (a lemmatizer deriving the canonical form of lexical items, that is, a single or a group of words conveying a single meaning, to enable the lexical lookups) of the filtered social media messages.

The system also employs MORPH 34, which is a lemmatizer which reduces the spelling of words to its lexical root or base/lemma form. In English, the base form for a verb is the simple infinitive. For example, the gerund "striking" and the past form "struck" are both forms of the lemma "(to) strike". The base form for a noun is the singular form. For example, the plural "mice" is a form of the lemma "mouse." Most English spellings can be lemmatized using regular rules of English grammar, as long as the word class is known. MORPH 34 uses a list of numerous such rules to reduce an ingested and non-filtered word to its base form. In accordance with a preferred embodiment the application MorphAdorner is utilized, the documentation of which, "MorphAdorner, A Java Library for the Morphological Adornment of English Language Texts", Version 1.0. Apr. 30, 2009, Copyright © 2007, 2009 by Northwestern University, is incorporated herein by reference.

Finally, the data composed of the filtered and NLP processed social media messages is supplied to the sentiment calculator 22 that calculates sentiment compositionally in the syntactic context. The process of sentiment calculation also employs an inference engine 24 that fine-tunes sentiment calculations using knowledge of the world. This process for sentiment calculation enables sentiment to be calculated on the basis of a set of rules deriving the polarity of stock events and their strength.

The problem of identifying the sentiment of social media messages on asset markets can be detailed as follows:
  i) the social media messages are short, for example a tweet using Twitter is limited to 140 characters;
  ii) the social media messages lack several constituents that are normally part of English sentences;
  iii) the social media messages are noisy, they include characters and expressions that are not part of English sentences;
  iv) the social media messages may be in a language other than English;
  v) in some cases, the social media messages are not complete English sentences and truncated messages are observed;
  vi) reported information, such as headlines, which do not directly convey sentiment, as well as social media messages conveying sentiments are also part of the ingest; consequently sentiments cannot be differentiated from facts;
  vii) the knowledge of the asset markets world includes constant as well as contingent knowledge; and
  viii) the sentiment is thus a function of the natural language expressions used in the social media messages in conjunction with the knowledge of these expressions as they are used in asset market exchanges.

The fact that tweets are constrained to 140 characters means that messages sent via Twitter begin to resemble programming languages such as Fortran (which originally had a constraint of 72 characters per line). The primary effect of this constraint is a limitation on the freedom available to the author of a tweet as he or she attempts to convey a specific message. This means that it is now possible to envision compiling tweets (akin to compiling a programming language) and achieving very high levels of accuracy in deriving sentiment whilst minimizing resource consumption and interpretation times. It therefore becomes feasible to ingest and process potentially millions of messages per hour using Common Off The Shelf (COTS) computers.

The technical advantage of the present system 10 relative to other known technologies is that the present system 10 is based on natural language processing techniques rather than machine learning techniques (for example, Naive Bayes, maximum entropy classification, and support vector machines), as described for example in Pang and Lee. Bo Pang and Lillian Lee 2002. *Thumbs up? Sentiment Classification using Machine Learning Techniques*. Proceedings of the 2002 Conference on Empirical Methods in Natural Language Processing (EMNLP), 79-86.

As will be appreciated based upon the following disclosure, the rule-based method that is used in accordance with the present invention avoids the shortcomings of the statistical method because it processes the social media messages directly instead of classifying social media messages on the basis of probabilistic algorithms. Another advantage lies in the innovative contribution of the inference engine 24, which contributes to reduce uncertainty and brings further support to decision making.

Because of their limitations, classification algorithms, such as Naïve Bayes classifiers, are not used in the implementation of the present invention. The present invention solves the problem by processing the actual content of the social media messages as they are formulated. It does not calculate the number of positive adjectives in a social media message, or in a set of social media messages, to compute sentiment, contrary to common practice.

The features of the present invention that provide a solution or benefit are the following:
  i) the ingestion of social media messages on the basis of targeted keywords according to the requirements of the stock traders (as discussed below in more detail);
  ii) the filtering of items that are not part of natural language (English);
  iii) the tagging of the items in the filtered messages with part-of-speech tags;
  vi) the recovery of the syntactic structure associated with each social media message;
  v) the application of the sentiment calculus rules to the output of the syntactic structure on the basis of the sentiment value of the lexical items and how they are syntactically combined;
  vi) the stock-specific lexical items and phrases of the major lexical categories (event denoting Nouns and Verbs, stock-market specific Adjectives and Adverbs) are associated with lexical sentiment values; and
  vii) the sentiment calculator applies to pairs of lexical items and their syntactic structures/constituents relating sentiment-marked lexical items in the syntactic configuration where they occur, ensuring the computation of an accurate sentiment-per-asset value.

The sentiment calculator 22 is a module of the multilayered architecture employed in accordance with the present system 10, which can be customized for different domains, including, for example, finance, security and pharmaceutics. In the disclosed application in the stock market exchange, the sentiment calculator 22 calculates sentiments from stock exchange-related social media messages 12 in order to predict stock movements before human traders can act.

The innovation brought about by the sentiment calculation in accordance with the present invention is the event driven approach to sentiment mining. Unstructured incoming social media messages 12 are processed in order to extract sentiment about pre-specified assets, as they participate in ongoing events. As will be explained below, the sentiment calculator 22 performs event-driven sentiment calculus.

The event-driven approach to sentiment mining as applied in accordance with the present invention can be represented in accordance with equation (1), where M stands for Modifier, Ev stands for Event, and x, . . . , z stand for the participants of the event. The asset the sentiment is about is a participant of the event.

$$(M(Ev(x, \ldots ,z))) \tag{1}$$

This relational approach to sentiment mining contrasts with the statistical keyword search approach, classifying messages on the basis of the number of positive or negative qualifiers. The statistical keyword search approach fails to provide sentiment-per-asset values.

The present invention takes an event to be a change in the relation between the participants of the event. The participants of an event are: names, organizations, locations, expressions of time, quantities, monetary values, percentages, etc. The present system 10 includes name entity recognition capacities and syntax-semantic capacities to provide the articulation of events and their participants. The interpretation of syntactic structure is generally compositional: that is, the interpretation of the whole is a function of the interpretation of the parts. However, part of the semantics conveyed by natural language is non-compositional and idiosyncratic. The idiosyncratic meanings are listed in lexicons assuming both generic (Sent-Lex 20) and domain-specific (Stock-Lex 18) lexicons As briefly discussed above, "sentiment" about an asset participating in an event is considered in accordance with the present invention to be the orientation (that is, the polarity in opinions expressed regarding the asset) and the strength of the opinions on that asset that deviates from the normal state. A sentiment is the expression of a psychological state relative to an event (whether that event be static or dynamic). Considering social media messages sent via the social networking site Twitter are limited to 140 characters, lexical items, emoticons and other diacritics found in such messages cannot express the richness of thought and sentiments conveyed by traditional written natural language without further processing. The present system and methodology focus on the properties of natural language employed in the social media messages to calculate the sentiment with respect to given objects in ongoing stock events referred to in social media exchanges.

In accordance with the present invention, sentiment is represented by an integer combining a polarity value (polarity positive +, negative −, neutral n) and a strength value ranging within a pre-defined scale. Using data generated by the filtering and natural language processing of the social media messages, the sentiment calculator 22 yields an integer that combines the polarity and the strength values of each pair of expressions relating an asset to an event as explained below in greater detail.

Polarity is a value (that is, positive, negative or neutral) that is part of the lexical specification of words and phrases. These values will compose according to the Polarity rules, provided below. Strength is an integer, that is, also part of the lexical specification of the words and phrases. The values for strength in accordance to a preferred embodiment of the present invention range from 1 to 3 (1 low and 3 is high). These numbers will be added in the processing of messages according to the Strength rules, provided below. However, it is appreciated that values for strength could range from 1 to 5 or higher.

The sentiment calculator 22 is embedded as part of the present overall system 10 that ingests social media messages from multiple social media sources based on user-specified criteria. As discussed above, the social media messages go through a filtering layer/module 14 purging the messages of noise (URLs, hashtags, etc.). The results of the filtering of social media messages are tokens which are assigned part of speech tags according to the lexical and contextual properties of the lexical items based upon NLP module 16. A parser 32 then recovers the major constituents/syntactic structures of the tokenized messages. The sentiment calculator 22 takes the annotated partial parses as its input and yields a sentiment-per-asset on the basis of the sentiment values of the lexical items and the sentiment logic, calculating the sentiment of constituents on the basis of the sentiment values of their parts. The sentiment calculator 22 interacts with the inference engine 24 to determine the sentiment with respect to the knowledge of the word.

Stock-Exchange Domain

For example, and considering the present system 10 as applied in the stock-exchange domain, the sentiment calculator 22 derives sentiment in terms of polarity and strength with respect to objects (for example, assets as referenced by tickers and commodity names) as they participate in ongoing stock events described by the ingested social media messages, for example, tweets, 12. The generic representation in equation (1) as noted above can thus be instantiated by equation (2) for this application.

$$M(\text{stock-event}(\text{stock-object } x, \ldots, \text{stock-object } z))) \quad (2)$$

As will be appreciated based upon the following disclosure, stock-market specific lexical items and phrases are qualified in the Stock-Lex 18, and the sentiment calculator 22 applies to pairs of sentiment-marked lexical items compositionally in their syntactic configuration.

As discussed above, the sentiment calculator 22 is a module of the pipeline making up the present system 10. The components of this system 10 process incoming social media messages, and yield a sentiment-per-object/asset for each ingested incoming social media message in real-time. The sentiment calculator 22 calculates the sentiment-per-asset for each incoming social media message ingested by the system 10.

FIG. 1 represents the three main components of the system: Ingest 11 (the social medial messages 12), Process 15 (the social media messages using the filter 14, NLP 16 and sentiment calculator 22), and Display 30 (the results on the processing step on a reaction indicator 31 in the form of a graphical user interface 30). It also identifies the specific NLP components/modules (POS 33, PARS 32, MORPH 34, Stock-Lex 18 and Sent-Lex 20) processing social media messages 12 from the ingest component 11 to the sentiment calculator 22 and its interaction with the inference engine 24 (which includes databases relating to Knowledge of the Stock Market world 23 and Knowledge of the world 25).

As discussed above, the architecture of the system 10 is shown in FIG. 1. The following explains the main features of each component of this architecture, where the lexicon, the part of speech tagger (POS) 33 and the parser (PARS) 32 can be parameterized to process different languages. Thus, in addition to the fact that this system 10 can calculate sentiment in different domains, it can also process sentiment cross-linguistically.

1. The Ingest Component

Simplex and complex keywords are used for ingesting the social media messages 12, according to the requirements of the stock traders. The hardware used for ingest are standard off the shelf computers gathering and processing social media messages using the pre-determined keywords. The techniques used for collecting social media messages must take into consideration the requirements of stock traders, see Section 1.1, as well as they must enable the collection of social media messages with respect to specific assets, as described in Section 1.2

1.1 The Requirements of Stock Traders

From a stock traders perspective, there must be a measurable and significant correlation between sentiment (as manifested in social media messages) and price movement. The correlation can be positive or negative. For example, there is usually a strong positive correlation between the performance of the financial sector and the S&P 500 and there is a negative correlation between Volatility and the S&P500. As there needs to be enough social media, for example, tweet, volume to provide confidence that the aggregate sentiment will have enough mass to move the asset price. In many cases, collecting all tweets pertaining to a single stock symbol will NOT meet the volume threshold that would produce a reliable correlation between sentiment and price. This can be mitigated by trading assets that have measured price correlations over an extended period of time by ingesting and processing tweets that pertain to all price-correlated assets and then using the sentiment derived from the above described aggregation of tweets to trade each individual asset.

1.2 Collecting Social Media Messages Regarding Specific Assets

The set of keywords for specific assets is defined in terms of generic categories that can be parameterized according to the finance domain. Depending on the nature of the asset, different strategies for ingesting a large number of relevant social media messages are used. For example, the following strategies may be employed:

(2) single keyword and exclude list of irrelevant combinations; or (3) binary keyword template of the form: object "X"+ predicate An example of the strategy (2) is used for Crude Oil, where only one keyword is used, "oil", and a very large exclude list include expressions such as "Soya oil", "olive oil", etc. In the case of commodities, such as Gold, strategy (3) is preferred. Strategy (3) employs a large include list made up of both unary and binary expressions including the word "gold", the object "X", and another word, a predicate, as in "gold industry", "gold news", "gold investor", "gold invest", "gold investment", "gold plunge", "gold raise", "gold plunged", "gold raised", "gold plunging", "gold raising", "gold decline", "gold declined", "gold declining", "gold rally", "gold rallied", "gold rallying", "gold fall", "gold falls", "gold falling", "gold fell", etc. A large exclude list is still necessary to exclude for example jewelry items and colors. Strategy (3) can be used for other commodities by substituting names of other commodities to the variable in (3) and keeping constant the set of predicates. Thus, a very similar set of keywords may apply to other commodities.

This technique using refined keyword strategy is used in conjunction with the methods described above to come up with a sufficiently large number of social media messages, and a high degree of correlation between derived sentiment and price movement, thereby meeting the two requirements of sentiment-price correlation and sufficient volume.

The refined keyword strategy for ingesting relevant social media messages increases the volume of ingested social media messages that will be fed into the other components of the system, described in the following paragraphs.

2. The Language Identifier Module

The ingested social media messages may include messages in a language other than English. A language identifier/detector 19 is therefore employed in identifying the language of an incoming message and assigns it a code. For example, the ingested social media message (4) will be assigned the code (5), which stands for English.

(4) Gold Rises but Lags as the Dollar Drops Sharply http://bit.ly/da88XX (5) en

Language identification is a prerequisite for the NLP processing in accordance with the present invention, as the overt syntactic properties vary between languages, as well as the form and content of the lexical items. It is thus necessary to ensure that the social media messages processed by the NLP module 16 will be English messages, or whatever language the system 10 was parameterized for.

3. The Filter Module

The filter module 14 is a pre-NLP processing module that brings social media messages 12 as close as possible to expressions in natural language by eliminating expressions that are not part of current use of language. For example, the filter module 14 eliminates URLs and hash tags at the periphery of the tweet, normalizes symbols and abbreviations, for example q1|1q|1$^{st}$ quarter| is replaced by "first quarter".

The filter module 14 also performs sentence detection on the basis of typographic cues. This is a necessary step in the pre-NLP processing, since social media messages may include more than one sentence, see (6). As the NLP processing and the sentiment calculus are sentence bound, sentence boundary delimitation is necessary. For example, the filter module 14 applies to (7), replaces the URL by a period, convert capitals into lower case, and yields (8):

(6) Crude Oil Is Unchanged as US Stocks Decline, China's Processing Surges:
The Cisco announcement sent stocks lower . . . _http://bit.ly/dyU40L
(7) Gold Rises but Lags as the Dollar Drops Sharply http://bit.ly/da88XX
(8) Gold rises but lags as the dollar drops sharply.

Thus, the filter module 14 takes an ingested social media message as its input and transforms the social media message to a less noisy English expression, which is then subject to NLP processing.

4. The NLP Processor 4.1 The Sent-Lex (Sentiment-lex)

The Sent-Lex 20 is a hand-crafted sentiment-based repository, or database, of the most frequent lexical items and phrases collected from the ingested social media messages, as well as from specialized vocabularies, that are indicative of sentiment. The lexical items and phrases vary according to the domain of application, e.g. finance, security, pharmaceutics, etc. Words that are not sentiment bearing, such as definite articles and auxiliaries, are not part of the Sent-Lex 20. In the present event-driven approach to sentiment mining, sentiment is associated to event denoting verbs and nouns, as well as with sentiment-bearing modifiers of events or of participants of the events.

The lexical specifications are designed to be parameterized to specific domains of application. The generic format of the lexical entry includes the lexical item, followed by fields of lexical specifications. The first field specifies the category of the item, the second field specifies its polarity, the third field specifies its lexical strength, and the fourth field specifies the polarity of the semantic arguments of the lexical items and phrases, if applicable.

(10) Lexial item, category, polarity, strength, argument's polarity and strength Thus, the lexical items and phrases and their features are stored in a lexical database, that is, the Sent-Lex 20. Each of the lexical items and phrases maintained in the Sent-Lex 20 is associated with a category tag, an inherent polarity value, an inherent strength value, and for some items, polarity and strength values are also associated to designated argument structure variables as in (11). For example, in the case of the verb acquire, the acquired object, the variable y in that verb's argument structure is associated with a positive value, as in (12), this is not the case for other verbs such a announce and report. Thus, in (13) Google is associated with a positive sentiment.

(11) Categorial tag: NN, VB, RB, . . .
Polarity values: +, −, n
Strength values: 1, 2, 3, where 1 is min. and 3 is max.
Argument structure values associated to the argument variables:
(x, y, z, w)

(12) acquire (x, y)
+2
(13) Apple acquired Google.
+2

The categories, nominal (NN), verbal (VB), adjectival (JJ), adverbial (RB) and their sub-categories, are intrinsically associated to polarity (+, −, n), and Strength (1, 2, 3). Furthermore, the lexical specifications differentiate degree modifiers, such as very, too and much from modifiers, such as good and better. Degree-intensifiers contribute their own lexical value, and add an extra value 1 to the category they modify, see (14) below for examples.

(14) Sample of the JJ/RB database:

|  | Tag | Polarity | Strength | Intensifier |
|---|---|---|---|---|
| Several | JJ | n | 1 |  |
| impressive | JJ | + | 2 |  |
| More | JJR | n | 2 |  |
| Most | JJS | n | 3 |  |
| Good | JJ | + | 1 |  |
| Better | JJR | + | 2 |  |
| Best | JJS | + | 3 |  |
| Very | RB* | n | 3 | 1 |
| Weak | JJ | − | 1 |  |
| Weaker | JJR | − | 2 |  |
| Weakest | JJS | − | 3 |  |
| So | RB* | n | 1 | 1 |
| Too | RB* | n | 1 | 1 |

4.2 The Stock-Lex (Specific Stock Trading Lexicon)

In the current application, the Stock-Lex 18 is the stock-based lexical repository, or database, consisting of the most frequent lexical items and phrases used in the ingested social media messages that relate to stock-based knowledge, as well as most frequent items used in stock exchange and financial news wire such as the Financial Post (or other commodity exchange system depending upon the application to which the present system 10 is applied). The Stock-Lex 18 thus includes a restricted set of stock-specific lexical items and phrases, associated with their domain specific polarity and strength values. The polarity values are: positive, negative and neutral. The lexical strength associated to the lexical items and phrases ranges from 1 to 3, where 1 is the lowest value and 3 is the highest value, see (15) for examples.

(15) decline, V, −, 2
decrease, V, −, 2
deleverage, V, +, 3
detain, V, −, 1
deteriorate, V, −, 2
develop, V, +, 1
die, V, −, 3
dip, V, −, 2

The stock-specific lexical items and phrases are part of the major lexical and phrasal categories, nominal, verbal, adjectival. Only event denoting nominal and verbal expressions are part of the Stock-Lex 18, and only stock specific adjectival and adverbial modifiers are part of the Stock-Lex 18.

Stock objects (tickers, company names, product names, etc.) have a neutral polarity and have no associated strength value. The sentiment calculator 22, as specified below, derives the sentiment with respect to specific stock objects.

The Stock-Lex 18 is a repository of the most frequent sentiment-bearing noun, verbs, adjectives and adverbs used in social media stock market-related exchanges. Each lexical item is associated with a part of speech (POS), a polarity and strength. The Stock-Lex 18 is handcrafted and contributes to the invention in providing sentiment specifications for event denoting items, and their dependents. The innovation is two-fold: i) it specifies sentiment values for other categories than adjectives, contrary to common practice; it specifies sentiment value for event denoting lexical items and their dependents, thus providing the lexical information used by the sentiment calculator 22 for the compositional calculus of the sentiment-per-asset.

4.3 The POS Tagger

The sentiment calculus applies to lexical items and phrases in their syntactic context. In order to derive the syntactic context for sentiment calculus, each incoming filtered social media message is broken into a stream of text, words, phrases, symbols, or other meaningful elements called tokens, that is, tokenized messages and each token is assigned a Part Of Speech (POS) by the POS tagger 33. In accordance with a preferred embodiment, Brill Tagger, that is, a known methodology for performing part of speech tagging, is used, as it is sensitive to the lexical properties and distributional properties of lexical items and phrases in natural languages. It is appreciated Brill Tagger is an "error-driven transformation-based tagger". Brill Tagger is error-driven in the sense that it recourses to supervised learning transformation and Brill Tagger is based in the sense that a tag is assigned to each word and changed using a set of predefined rules.

The POS tagger 33 is necessary in accordance with the present system 10 to identify the lexical items that contribute to the sentiment calculus, namely adjectives (JJ), adverbs (RB), as well as event denoting verbs (e.g., to upgrade) and nouns, e.g. (e.g., an upgrade). Thus, the POS identification of the elements of the event structure (16), (17), reduces the complexity of sentiment mining, and contributes to the precision of the sentiment calculus.

(16) (M (Event (x, y)))
(17) (JJ/RB (NN/VB xp, yp)))

Thus, the POS Tagger 33 applies to the ingested filtered social medial messages, tokenizes the string and assigns part of speech to the tokens on the basis of a set of lexical and contextual rules, accounting for the distribution of categories in natural language texts. To illustrate, Brill Tagger applies to (18) and derives the annotated tokenized string in (19).

(18) Gold Rises but Lags as the Dollar Drops Sharply.
(19) Gold/NNP rises/VBZ but/CC lags/VBZ as/IN the/DT dollar/NN drops/VBZ sharply/RB ./.
where the Brill tags NNP stands for proper noun, VBZ stands for verb, CC stands for conjunction, IN stands for preposition, DT stands for determiner, NN stands for common noun, and RB stands for adverb.

The majority of operating sentiment mining systems detect sentiments only on the basis of mining of adjectives with positive, e.g., good, great, excellent, or negative value, e.g., bad, worse, terrible, and so on. However, other parts of speech also convey sentiment. This is the case of adverbs in the verbal domain, which modify the event (action or state) described by the verbal projection they modify, like adjectives in the nominal domain, which modify the object denoted by the nominal projection. In this relational approach to sentiment mining as applied in accordance with the present invention, sets of POS are related to the elements of event structures, for example in (16), (17) above the M can be adjective JJ or adverb RB, the event can be a noun NN or verb VB. The identification of the POS of the tokens of the filtered social media messages reduces the complexity of sentiment mining as well as it contributes to its efficiency.

4.4 The Parser

The tokenized and POS annotated messages resulting from the POS tagger 33 are fed to a partial parser 32 that recovers the main syntactic constituents of the social media messages. The partial sparser 32 employs a Cass parser, Abney's cascaded FST (Finite State Transducer), to recover the main syntactic constituents of the basis of the tokenized and POS annotated representations of social media messages, as illustrated in (20).

(20) Gold/NNP rises/VBZ but/CC lags/VBZ as/IN the/DT dollar/NN drops/VBZ sharply/RB ./.

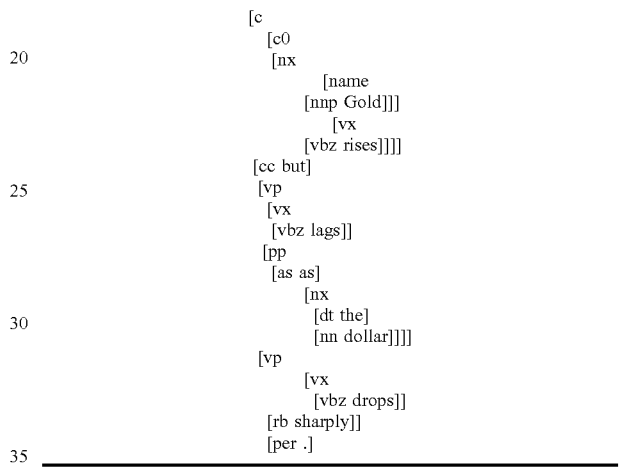

Partial parsing is designed for use with large amounts of noisy text. Robustness and speed are primary design considerations. Not all NLP applications require a complete syntactic analysis. Partial parsing is used in information retrieval as well as information extraction applications, such as facts and sentiment mining, where finding simple nominal and verbal constituents is enough. Full parser provides more information than needed, and when expected information is missing, as it is generally the case in social media messages, where syntactic reductions and truncation are necessary to convey meaning within limited character constraints, for example, 140 characters when considering tweets using Twitter.

The leaves of the parse tree are associated with their sentiment values via access to Stock-Lex 18 and the sentiment calculator 22 applies to the resulting semantically annotated tree. The main properties on the calculator are described in the following section.

5. The Sentiment Calculator

A sentiment is an integer, which can be either positive or negative, computed on the basis of the application of the rules of the sentiment calculus to pairs of lexical items in their local syntactic context; for example, nouns (that is, nominal lexical items) representing assets and nouns/verbs/adjectives (that is, nominal, verbal or adjectival lexical items) representing sentiment in the form of polarity and strength. The computed sentiment value ranges within a pre-established scale. In accordance with the present invention, the sentiment calculator 22 uses social media messages for the real-time evaluation of publicly traded equities and commodities wherein a sentiment is a positive or negative integer computed based upon pairs of lexical items in local syntactic context. In its most basic components the sentiment calculator employs a mechanism for determining lexical polarity in social media messages and a mechanism for determining a strength value of lexical items and phrases used in social media messages.

The sentiment calculus employed by the sentiment calculator 22 applies to the output of the annotated Cass tree produced by the partial parser 32. It compositionally derives the sentiment associated to entities in the event denoted by the expression they are part of. The sentiment logic is a compositional calculus deriving the sentiment value of a relation on the basis of the sentiment values of its parts.

In the specific domain of stock-market exchanges, the sentiment logic calculates sentiment values per asset with respect to stock market events described by the incoming social media messages. Namely, it calculates the sentiment with respect to given assets, as they occur is stock events.

As discussed above, the social media messages relating to an asset are gathered by a set of keywords used for ingesting the social media messages. The sentiment calculus is based on the lexical polarity and strength value of the lexical items and phrases defined in the Stock-Lex 18 and how they are syntactically organized in the Cass tree. The maximal local domain for the application of the calculus is the sentence; the minimal local domain is the smallest constituents including the keywords standing for the asset. The sentiment calculus applies locally to the constituents including the asset within the sentences of the message. The Cass parser derives the syntactic constituents of the sentences, including the adjectival (cx), as well the nominal (nx) and the verbal (vx) constituents.

The polarity and strength rules apply to syntactic constituents in head-complement, modifier-modified, and subject-predicate relations, which are identified on Cass trees. These relations are defined as follows. A head of a constituent is a lexical item, such as a verb, e.g., hit, or a noun, e.g., acquisition, that makes the constituent it is part verbal (vx) or nominal (nx). A head selects a complement, which is a syntactic constituent such as a nominal phrase, e.g. the market in hit the market, and AAPL in the acquisition of AAPL. A modifier is an adjective or an adverb that modifies another constituent, a nominal constituent in the first case and a verbal constituent in the other case, e.g., strong market and strongly hit the market. The subject-predicate relation is the relation between a subject, generally a nominal constituent and a predicate, generally a verbal constituent, e.g., in the sentence AAPL hits the market, AAPL is the subject and hit the market is the predicate.

The sentiment calculus includes separate rules for calculating the polarity and the strength. They have the generic form of dyadic operators (Op (arg1, arg2)), and their specific form is dependent on the relation between arg1 and arg2, as well as the lexical polarity and strength values of the lexical items and phrases specified in the Stock-Lex 18.)

Polarity (Pol):

Pol (arg1, arg2), where arg1 is a head and arg2 is a dependent. The rule applies locally in syntactic constituents/domains, e.g., nx, vx, cx, etc. It derives the polarity of constituents on the basis of the polarity of their parts and how they are syntactically related. The polarity rules apply in three universal syntactic relations defined above (that is, head-complement, modification (modifier-modified), and predication (subject-predicate) relation), according to the polarity of the parts of the relations. The Polarity rules include the following:

Pol Rules:

Pol ([x] [y])=Compose ([x], [y]) as specified by the following rules:
(21) if (x is NEG) and (y is +), then Pol (y=−) NEG, +=− no upgrade
if (x is NEG) and (y is −), then Pol (y=n) NEG, −=n not bad
if (x is NEG) and (y is n), then Pol (y=n) NEG, n=n no report
(22) if (Pol (x)=Pol (y)), then
if (x is n) and (y is n), then Pol (y=n) n, n=n average result
if (x is +) and (y is +), then Pol (x=+) +, +=+ announce an upgrade
if (x is −) and (y is −), then Pol (y=−) −, −=− downgrade to sell
(23) if (Pol (x)≠Pol (y)), and
if (x is +) and (y is n), then Pol (y=+) +, n=+ impressive report
if (x is +) and (y is −), then Pol (x=−) +, −=− impressive downgrade
if (x is −) and (y is n), then Pol (y=−) −, n=− weak report
if (x is −) and (y is +), then Pol (y=−) −, +=− missed rally
if (x is n) and (y is +), then Pol(y=+) n, +=+ average upgrade
if (x is n) and (y is −), then Pol (y=−) n, −=− average depreciation Strength (Str):

Str (arg1, arg2), where arg1 is a head and arg2 is a dependent. The rule applies locally in syntactic constituents/domains, e.g., nx, vx, cx, etc. It derives the strength of constituents on the basis of the strength of their parts and how they are syntactically related by the application of an arithmetic operation to the pair of arguments depending on the nature of the syntax-semantic relation and the polarity of the constituents. The strength rules apply to the lexical items and phrases in the three universal syntactic relations, and the strength is calculated on the basis of elemental arithmetic operations. The Strength rules include the following:

Str Rules:

Function (arg1, arg2), where arg1 is a head and arg2 is its dependent

Str ([x] [y])=Compose ([x], [y]) as specified by the following rule:
(24) if (x is the head (h)) and (y is the complement (o)), then Str (x)+Str (y)
if (x is the head (h)) and (y is the modifier (m)), then Str (x)+Str (y)

Function (arg1, arg2), where arg1 is a modifier and arg2 is the modified

Str ([x] [y])=Compose ([x], [y]) as specified by the following rules:
(25) if (x is JJ, RB) and (y is NN, VB), then Str(x)+Str (y)
if (x is an JJ, RB) and (y is a JJ, RB), then Str (x)+Str (y)
if (x is RB*) and (y is a JJ, RB), then Str (x)+Str (y)

It is appreciated that social media messages may include more than one sentence, may talk about more than one asset, more than one stock event, and they may express more than one sentiment. Computing blindly the sentiment values of all the lexical items and phrases of social media messages, the resulting value is general and not necessarily asset specific. The sentiment calculator 22 is sentence bound. Moreover it calculates sentiment in the local syntax-semantic domain of an asset. Thus, it ensures that the specific sentiment with respect to a given asset conveyed by a message is calculated. It applies iteratively in the local domain of the constituent including the asset (keyword, set of keywords), e.g. OIL, or GOLD, and the expression of a stock event (e.g., "lose", "gain", "sell", "buy") or a sentiment (e.g., "high", "low").

The following trace for the tweet (26) illustrates the application of the sentiment calculator 22 that calculates sentiment-per-asset in the local domain of the targeted asset: Oil. The calculus assigned the value +3 to Oil, discarding the value of the computation for Canadian dollar, which is −5.

(26) Canadian dollar falls for second week. Crude Oil prices raises.

```
[root {oil: Positive,3.0,null}
[sen  {_: Negative,5.0,null}
  [c    {_: Negative,5.0,null}
   [c0   {_: Negative,3.0,null}
    [nx    {_: Null,null,null}
     [jj [{_: Null,null,null}]]          (Canadian)]
     [nn [{_: Null,null,null}]]          (dollar)]
    ]
    [vx    {_: Negative,3.0,null}
     [vbz [{_: Negative,3.0,null}]]      (falls)] <<<< {−}
    ]
   ]
   [pp    {_: Neutral,2.0,null}
    [in [{_: Null,null,null}]]           (for)]
    [nx    {_: Neutral,2.0,null}
     [jj [{_: Neutral,2.0,null}]]        (second)]
     [tunit [{_: Null,null,null}]]       (week)]
    ]
   ]
  ]
  [per [{_: Null,null,null}]]            (.)]
]
[sen  {oil: Positive,3.0,null}
  [c    {oil: Positive,3.0,null}
   [c0   {oil: Positive,3.0,null}
    [nx    {oil: Null,0.0,null}
     [jj [{_: Null,null,null}]]          (Crude)]
     [nn [{oil: Null,0.0,null}]]         (oil)] <<<< {K}
     [nns [{_: Null,null,null}]]         (prices)]
    ]
    [vx    {_: Positive,3.0,null}
     [vbz [{_: Positive,3.0,null}]]      (raises)] <<<< {+}
    ]
   ]
  ]
]
```

This example shows that every step of the computation by the modules of the system provides the structure for the application of the sentiment calculus. This calculus applies in local syntactic domains and provides an integer that represents the sentiment (polarity and strength) with respect to designated assets.

6. The Inference Engine

Inference engine 24 is part of expert systems, which are designed to process a problem expressing an uncertainty with respect to a decision, and to provide a decision, or a set of decisions reducing the uncertainty. Inference engine 24 attempts to provide an answer to a problem, or clarify uncertainties where normally one or more human experts would need to be consulted.

The inference engine 24 of the present system 10 is part of the pipeline and provides a mechanism to sharpen the accuracy of the sentiment computed, by bringing both knowledge of the stock market world 23 and knowledge of the world 25 into the computation.

The inference engine 24 includes a data structure, and a set of inference rules (if X then Y) relating facts to sentiments. This knowledge interacts with the domain-specific knowledge stored in the lexicon and used by the sentiment calculator 22.

The inference engine 24 includes a data structure, a knowledge base that uses some knowledge representation structure to capture the knowledge of a specific domain, for example a relational table relating entities in knowledge domains, and a set of inference rules applying to the entities in the relational table and drawing consequences. One advantage of inference rules over traditional programming is that inference rules use reasoning, which more closely resembles human reasoning. In the specific application of stock-market trade, the knowledge base consists of a relational table relating stock entities (tickers, company names, products, etc.), stock events (e.g., upgrade, downgrade) and facts, extracted from news wire. The rules of the inference engine 24 apply to the elements of the relational table and infer sentiment values.

(27) Damn you OPEC! Will this be the summer we finally see $5/gal at the pump??? I sure hope not. Kills any similar fun from last summer For example, the knowledge base includes (28) below, and the inference rules (29) below, stating that if gas oil (at the pump) is inferior to $3 then the sentiment value is positive, +2, if the gas oil is superior to $3 then the sentiment value is negative, −2. This real world knowledge varies according to time and place.

(28) OPEC, oil, $X/gal, locations

(29) In "$X/gal" expressions, where X is a digit
  if X is inferior to 3 then polarity =+, and strength is 2
  if X superior to 3 then polarity =−, an strength is 2

The sentiment calculator 22 alone would not derive the negative sentiment associated to the second sentence in (27). While the sentiment calculator 22 assigns the value neutral to questions, the inference engine 24 assigns the sentiment value of −2.

Thus, the inference engine 24 ensures that the sentiment is grounded in the real world. It contributes to the innovative technology, which leads to both simplify and sharpen decision taking in stock market transactions.

Sentiment calculations in accordance with the present system 10 are a result of the pipeline or multilayered embodied by the present invention that ingests social medial messages, identifies the language of the social media messages, and filters them from elements that are not part of natural language for which the system 10 has been parameterized (here English). The POS tagger 33 and the partial parser 32 modules of the NLP processor 16 assign parts of speech to the tokens of sentences, and recover the structure they are part of. The sentiment calculus of the sentiment calculator 22 applies to the annotated structures and derives the sentiment value per asset based on the sentiment value of the event they are part of. Finally the inference engine 24 reduces uncertainly by relying on a relational database including knowledge of the world information and a set of inference rules.

The present sentiment calculation system includes computer implemented mechanism for obtaining and converting ingested unstructured social media messages regarding a plurality of objects/assets being tracked into a sentiment value for each object/assets. The sentiment value includes a polarity value and strength value derived from a natural language processing algorithm containing a database of lexical items and phrases related to the objects being tracked. The precise sentiment value per object is derived by the compositional calculus based on the sentiment values of lexical items (and phrases) and their syntactic organization.

The contextual sentiment value is based on the inference engine 24 deriving a sentiment value with respect to knowledge of the world. The interaction of the sentiment calculus and the inference engine 24 yields accurate sentiment in real-time. The sentiment cognitive-based calculus relates conceptual processing with natural language processing algorithm.

7. Reaction Indicator

As discussed above, the data generated by the sentiment calculator 22 is applied to a graphical user interface 30 that combines sentiment and intensity data relating to the assets. The graphical user interface 30 includes moving graphic objects displayed upon a monitor that depict social media market sentiment; a timeline slider object 46; and a vertical bar chart object 44.

In accordance with the present invention, the graphical user interface 30 provides for the visualization of graphic objects in the form of moving spheres 40 where the sphere size and color depict social media market sentiment. The moving spherical graphic objects 40 shrink and grow based on intensity changes. The sphere color changes based on social media sentiment polarity. The center sphere 40a represents the weighted sentiment average. Clicking one of the moving spherical graphic objects 40 results in the display of a chart 42 (see FIGS. 6A & 6B) graphing (based on what the trader selects) all or a choice of price, volume, social media frequency, social media sentiment, cross-correlation and a variety of price and sentiment derived technical indicators. Sphere updates are based on a configurable polling time.

The graphical user interface 30 contains a time slider 46 to go back to a point in time and replay history. A vertical bar chart 44 graphs the social media sentiment when the graphical user interface 30 is in full screen mode.

The purpose of the reaction indicator 31 is to provide a mechanism wherein hundreds of assets can be tracked, but only those that are "interesting" based on preprogrammed parameters will float to the surface and draw the viewer's attention.

Figure 2:
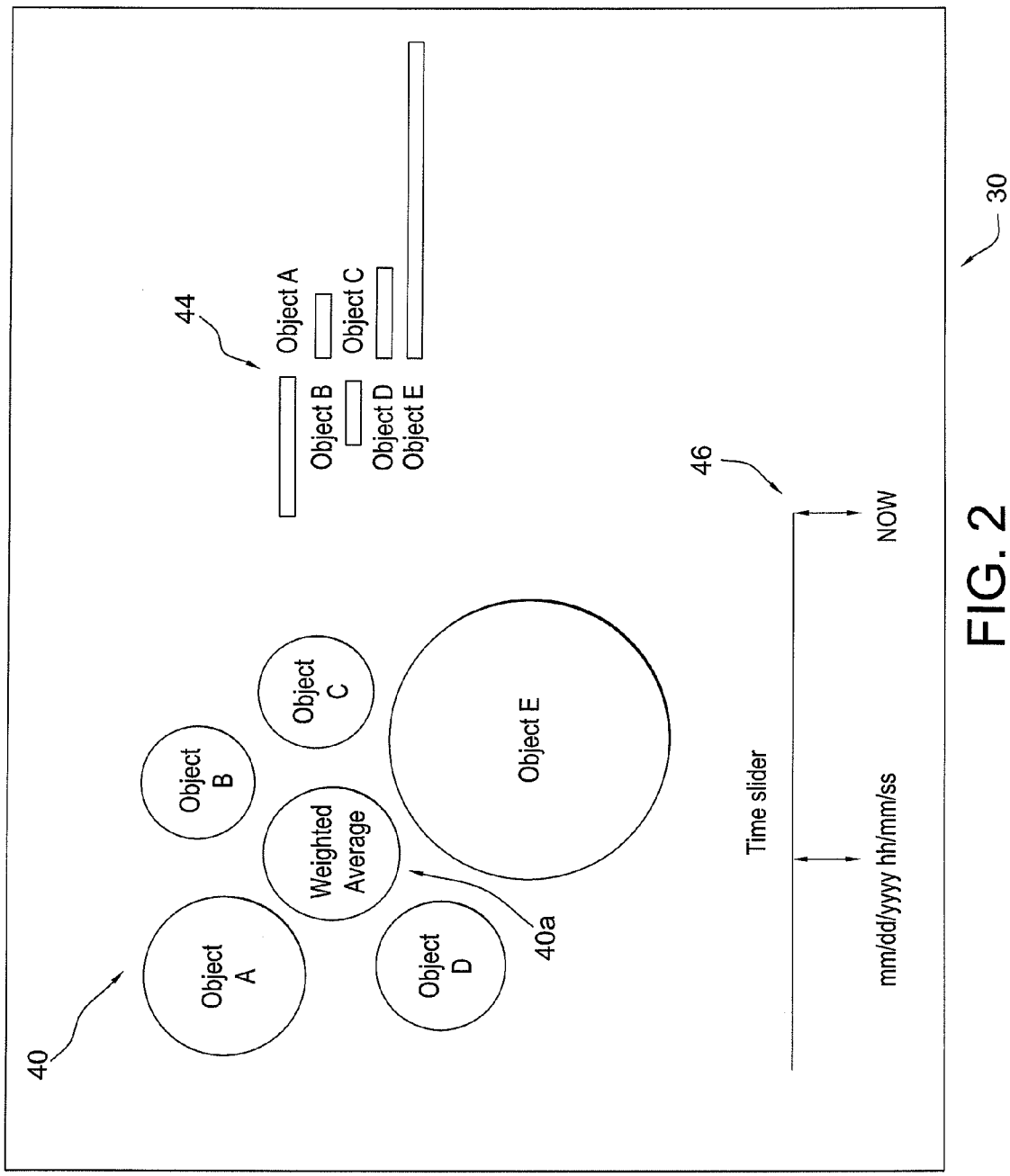
FIG. 2 is a representation of the graphical user interface in accordance with the present invention.

More particularly, and with reference to FIGS. 2, 3, 4, 6 and 7, the reaction indicator 31 provides a graphical user interface 30 displaying three graphical areas of objects, moving spherical graphic objects 40, a timeline slider object 46 and a vertical bar chart object 44. It is noted the moving graphic objects may take shapes other than spheres, such as squares. Referring to FIG. 2, the spherical moving graphical objects are represented at 40, the timeline slider object at 46 and the vertical bar chart object at 44.

The reaction indicator polls a data stream containing mathematically computed values for social media intensity, social media sentiment, social media frequency, social media weighted average frequency and social media weighted average sentiment auto refreshing the moving spherical graphic objects 40 and the vertical bar chart object 44 based on a configurable polling time. Intensity is defined as the ratio of short term frequency divided by long term frequency. The mathematical computations for the data stream are calculated by an algorithm discussed herein in detail in a section related to cross correlation. The calculations are based upon information obtained from a multilayer pipeline architecture previously discussed.

Figure 7:
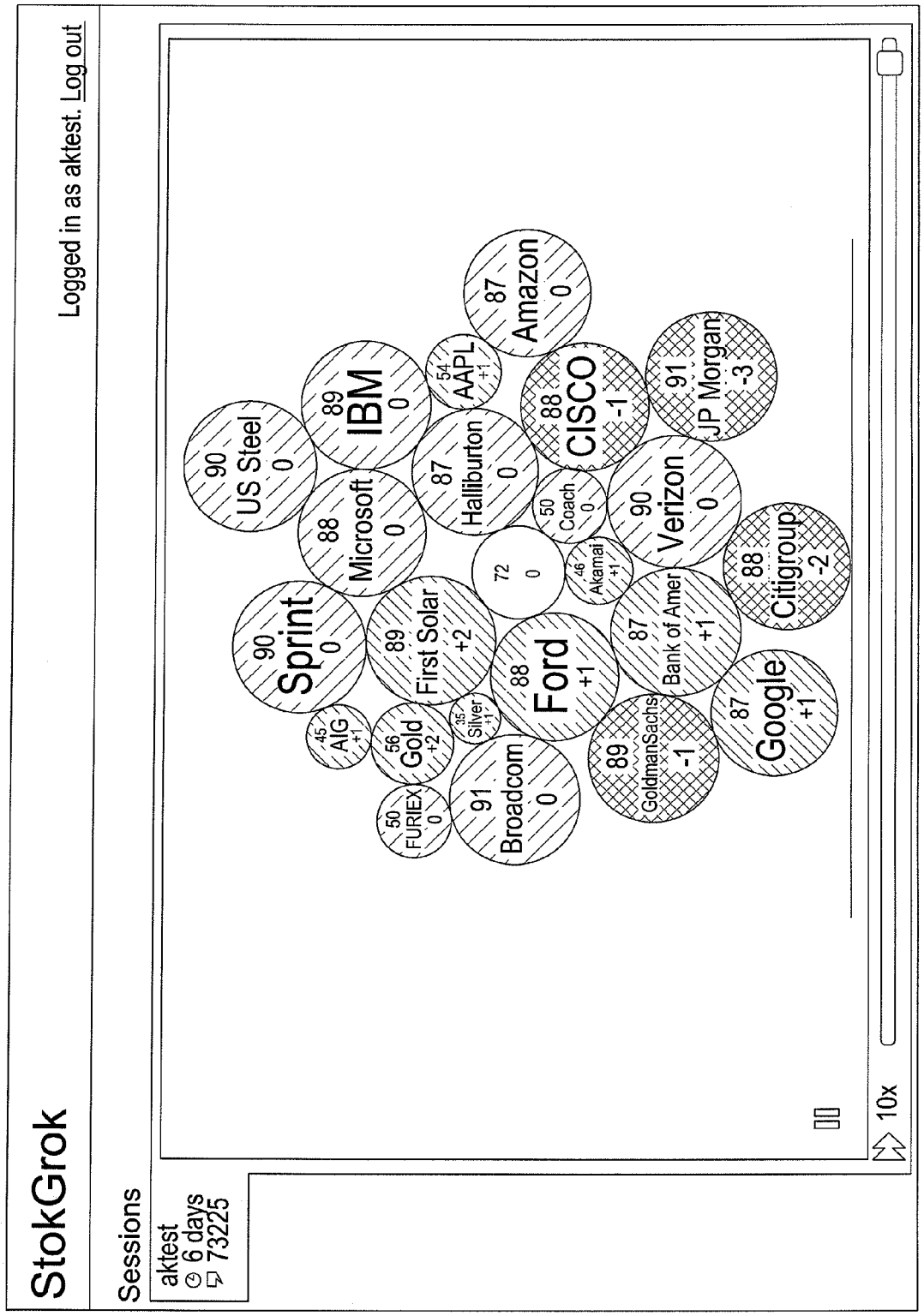
FIG. 7 is a screen shot showing various moving spherical graphic objects shrinking and growing based on social media intensity thereof.

Referring to FIG. 7, the moving spherical graphic objects 40 shrink and grow based on the social media intensity attribute and are sized relative to each other taking into consideration the stage size and browser screen resolution. The color of the moving spherical graphic object 40 is based on social media sentiment polarity where polarity is defined as negative, neutral or positive. Each of the moving spherical graphic objects 40 displays a label, social media sentiment and social media frequency.

Figure 3:
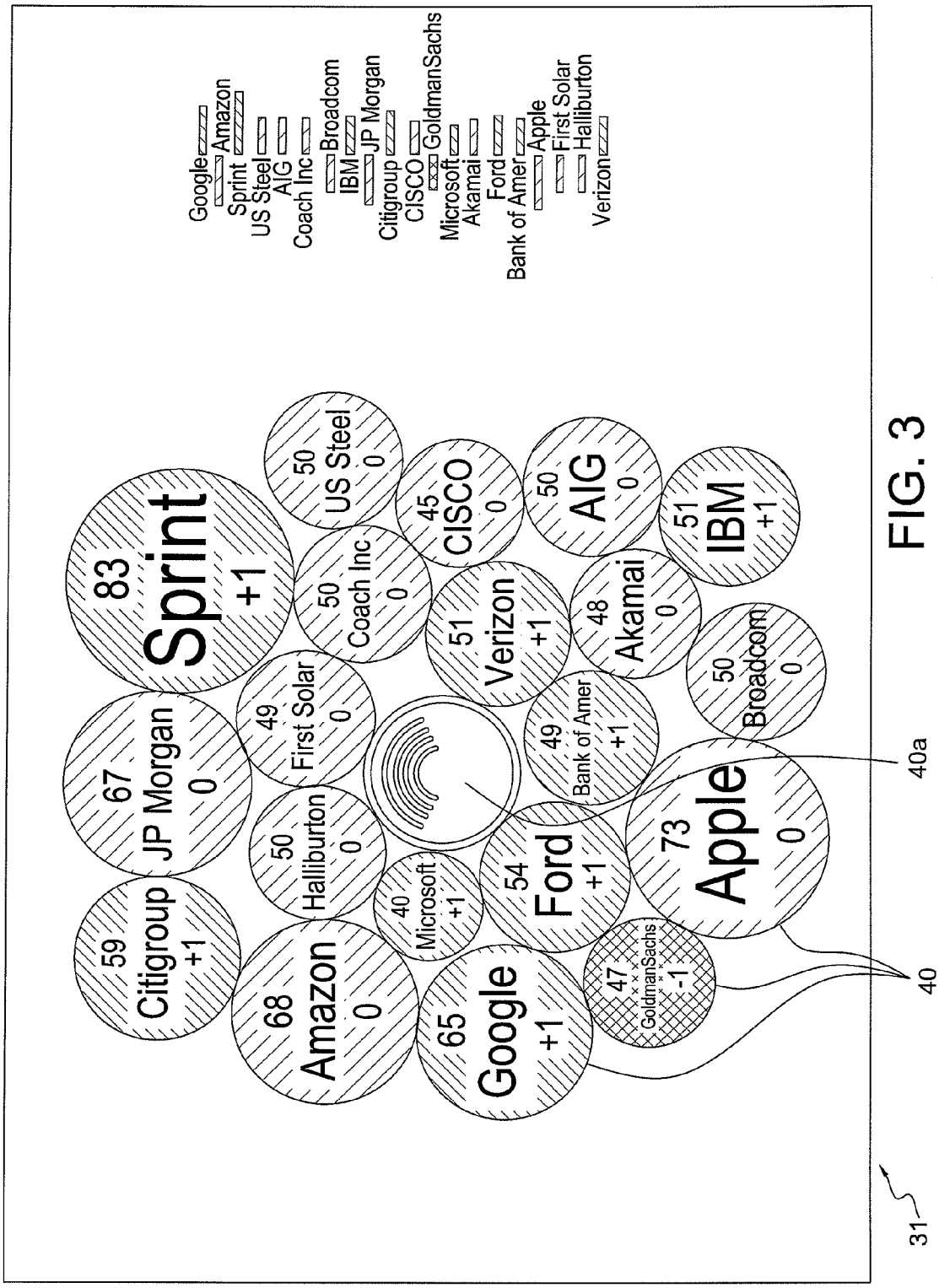
FIG. 3 is a partial view of the reaction indicator.

The center sphere 40a object visualizes a weighted average of all sphere objects based on weights assigned to the spheres. Referring to FIG. 3, the weighted sphere object is represented at 40a. The weighted average sphere size is static relative to the other sphere objects, which shrink and grow, and displays weighted average social media sentiment and weighted average social media frequency, if sphere weights have been assigned. If sphere weights have not been assigned, the weighted average sphere object does not display any data. The weighted average sphere object does not change color to reflect social media sentiment polarity. An example where weights may play a role is in the instance where the visualization represents an Exchange Traded Fund (ETF). An ETF holds assets such as stocks, commodities or bonds. The assets would be represented in the spheres. The weight for each asset assigned would represent the percentage in the ETF for an amalgamation of all assets.

The timeline slider object 46 visualizes a timeline where the date and time on the left represent the earliest date and time where data exists for the collection of moving spherical graphic objects 40. The date and time on the right represents current date and time. Moving to various points on the timeline slider object 46 move the moving spherical graphic objects 40 and the vertical bar chart object 44 to a point in time, pausing the real-time display, then replaying history. From the historical point in time selected, the moving spherical graphic object 40 and the vertical bar chart object 44 will poll the data stream coming from the sentiment calculator 22 for social media intensity, social media sentiment, social media frequency, social media weighted average frequency and social media weighted average sentiment from the point in time selected then rerun history as if it were happening real-time. Referring to FIG. 2, the timeline slider object is represented at 46.

The vertical bar chart object 44 utilizes the same data stream as the moving spherical graphic objects 40 to graph social media frequency, using the same color scheme as the spherical objects. Referring to FIG. 2, the vertical bar chart object is represented at 44.

Figure 6A:
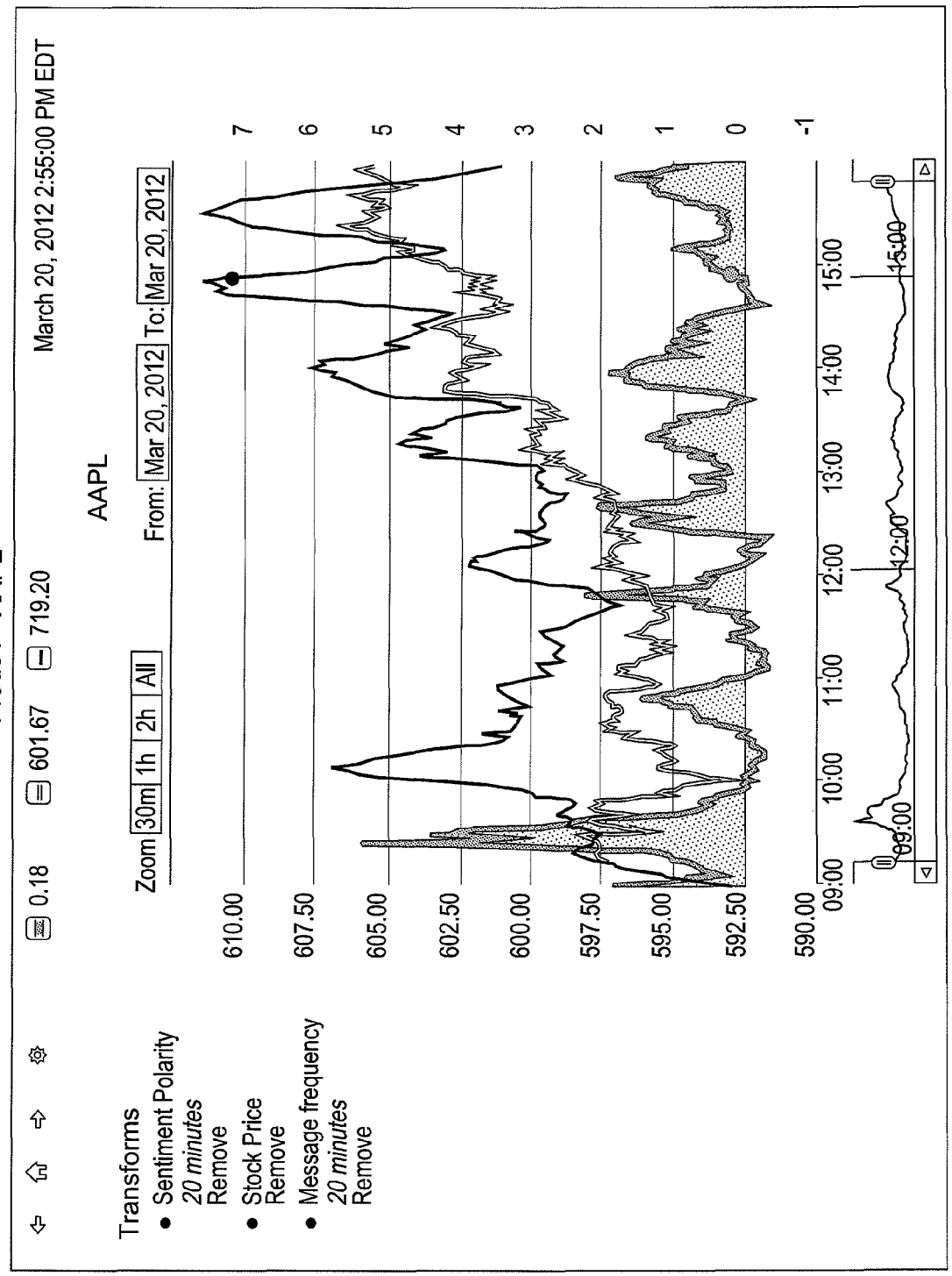
FIGS. 6A and 6B are screen shots when a moving spherical graphic object is clicked in the graphical user interface.
Figure 6B:
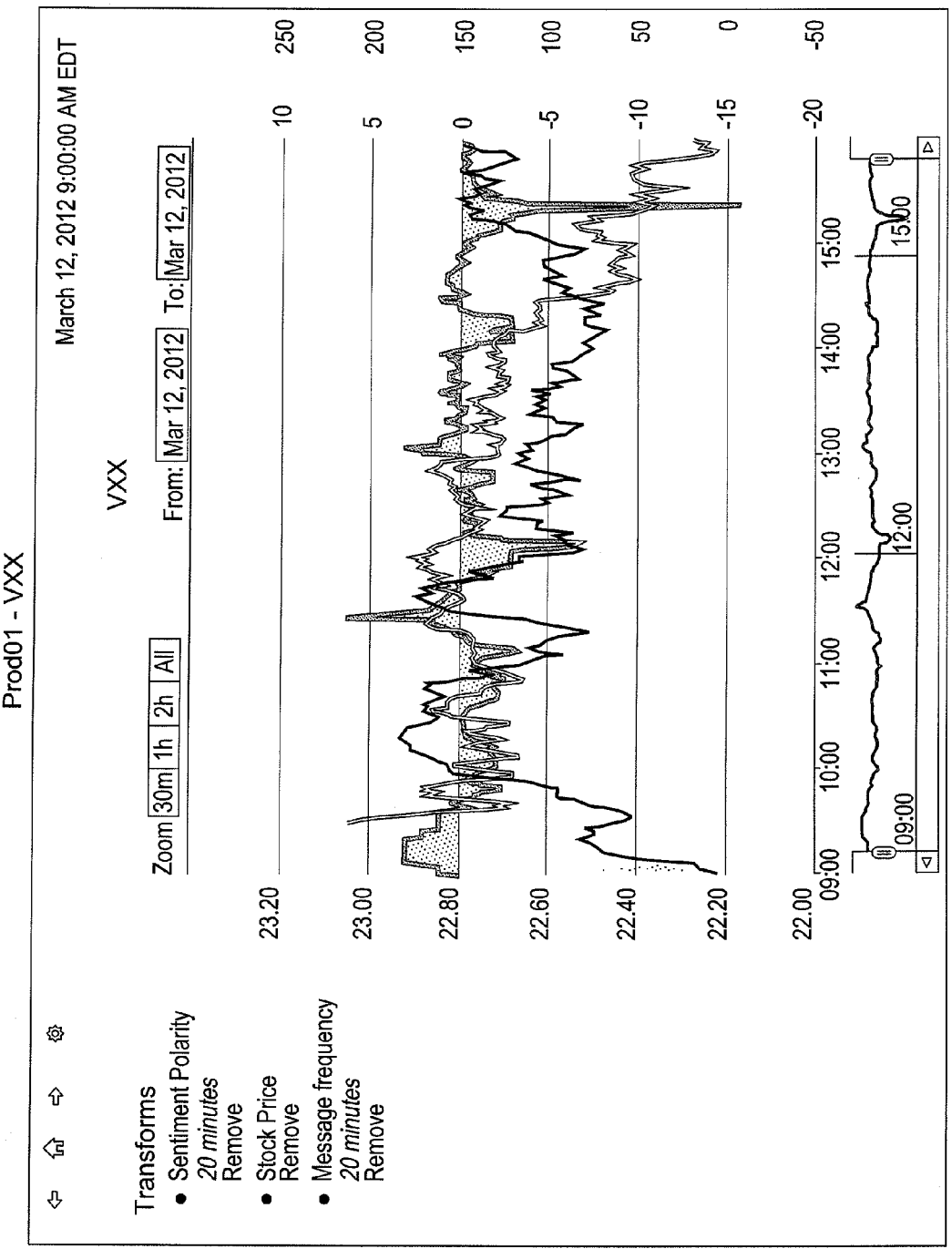

Clicking on a moving spherical graphic object 40 will launch a chart, graphing price, volume, social media sentiment, social media frequency, and cross-correlation auto refreshing based on a configurable time, e.g. every second as seen in the screen shots depicted in FIGS. 6A and 6B.

Each of the moving spherical graphic objects 40 display a symbol, such as an exclamation mark within the sphere, preferably in the center, when an alert has been triggered. Specifically, a trigger will result when sentiment and intensity variables cross certain thresholds, the related moving spherical graphic object shall display an exclamation mark, signaling a potential trading opportunity; for example, when the sentiment and intensity for a given asset A exceeds a preprogrammed value indicating sell. An exclamation mark will be displayed in the center of sphere A alerting the operator to take action. The operator shall have the option of directly executing a trade via a combination of keyclicks. The operator can program the reaction indicator 31 to automatically place a trade. The operator can program the reaction indicator 31 to send an alert via e-mail or text message.

In summary, the reaction indicator 31 comprises a plurality of moving graphic objects 40 which change size and color based upon social media market sentiment, intensity and frequency captured and correlated in real-time from a stream of online social media messages related to a market segment. The moving spherical graphic objects 40 shrink or grow in size based upon the social media intensity attributed to each moving spherical graphic object 40 and the moving spherical graphic objects 40 change color based upon whether the social media sentiment attributed to each moving spherical graphic object is positive, negative or neutral. The reaction indicator 31 also provides a weighted average of all displayed moving spherical graphic objects 40 displayed based on weights assigned to the objects prior to capturing social media streams is displayed among the plurality of displayed objects.

Sentiment, Intensity Cross-Correlation

As discussed above, once sentiment and intensity are fully appreciated, the present system and method provides a mechanism for cross-correlating the sentiment and intensity data with the actual fluctuations with asset prices. The present invention provides two methods to find patterns in a target real-valued time series by utilizing two other real-valued time series derived from a stream of social-media messages (Twitter for instance): sentiment and frequency.

- The target is arbitrary. It represents a quantifiable property of the asset that is being tracked. For instance, we have applied the algorithm using stocks and commodities as asset, and their market prices as targets.
- The sentiment, as defined previously, is relative to the asset underlying the target.
- The frequency represents the volume of messages about the asset. It is derived from the sentiment time series and a parameter called the window size.

Figure 4:
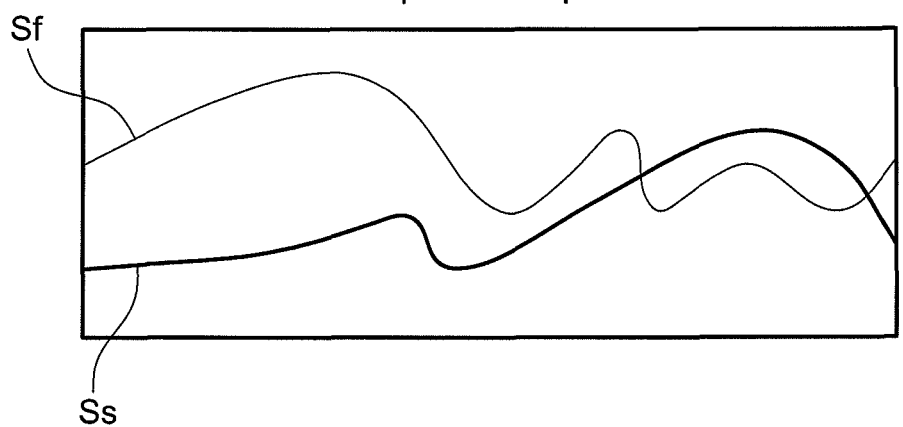
FIG. 4 is a graphical depiction showing the correlation of frequency and sentiment.

When supplied with a window size, and applied in real-time those methods have a predictive value on the target. For this reason the series used to find patterns in the target, such as the sentiment series and the frequency series, are called predictive. As shown in FIG. 4, the patterns can be depicted graphically on charts, together with the time series, to be used as a decision making tool.

The patterns can also serve as the input to an automated trading system to generate trading signals.

In the example shown in FIG. 4, the curves are a depiction of the sentiment time-series for the target (thick curve labeled $s_s$) and the sentiment-frequency time series (thin curve $s_f$). The calculation of the sentiment-frequency series will be described later.

From a visual inspection of the picture it is easy to see that the target is reproducing the bell pattern the sentiment-frequency curve had earlier. This provides the ability to predict the future move of the target better. Looking at the sentiment times series $s_s$ for the target only, it seems the target is dropping sharply. However, using the pattern of the sentiment-frequency, one can anticipate that the target will soon experience a rather important rebound. This is the predictive value of the method. A visual inspection of FIGS. 6A and 6B will reveal that sentiment, despite NOT being derived from price, can show extremely strong correlation to price, either as a leading indicator or a supporting indicator, both scenarios being extremely relevant and useful to stock traders.

As will be appreciated based upon the following disclosure, the method of the present invention finds patterns in a target real-valued time series by utilizing sentiment and frequency derived from a stream of social-media messages, wherein the target represents a quantifiable property of an asset being tracked. The method includes identifying a target, which is a sampled real-valued time series; generating a sentiment time series, $s_s$ (which is plotted); generating a frequency time series plot, $s_f$ (which is plotted); and determining a pattern based upon the sentiment time series and the frequency time series.

Formal Definitions

A real-valued time series is defined as a sequence of pairs (time (t), value (s)), also called points, ordered by increasing time. A simple time series could look like this: [(12:36,27), (13:03,37),(16:34,88)].

Formally the space of time series is defined as $T_s = \wp^F \mathbb{R} \times \mathbb{R}\mathbb{R}$, that is the set of finite subsets of $\mathbb{R} \times \mathbb{R}$, whose elements are endowed with the total order $<: ((t,s), (t', s')) \in (\mathbb{R} \times \mathbb{R}\mathbb{R}^2 \mapsto t' < t' \in \{true, false\}$.

Using the order $<$, each series $s \in T_s$ is naturally mapped to the vector $V(s) \in \mathbb{R} \times \mathbb{R}^{\#(s)}$ such that $v_i$ is the $i^{th}$ element of s. The vector of first components will be denoted by $V_1(s)$ and the vector of second components $V_2(s)$.

For example,
={(12:36,27), (13:03,37), (16:34,88)}
V(s)=[(12:36,27), (13:03,37), (16:34,88)]
$V_1(s)$=[12:36,13:03,16:34]
$V_2(s)$=[27,37,88].

A semantic distinction is drawn between pulsated time series where points represent a punctual event (i.e., sequence of Diracs), such as the arrival of a message, and sampled time series that represent a discretization of a function that's defined at all times, such as the market price. It is thus natural to interpolate points of a sampled time series to try and recover the original function it was sampled from.

The target is an arbitrary sampled real-valued time series. The algorithm has been applied with prices as target.

The sentiment time series $s_s$ is generated by the Natural Language Processing (NLP) module 16. It is a pulsated time series. For each message in the input stream, the sentiment time series contains a pair whose time is the time when the message was posted, and whose value is the result of the NLP processor 16. This value is called sentiment.

The frequency time series $s_f$ depends on two parameters: the sentiment time series and a positive number w representing a time called window size. It is a pulsated time series. For each point (t, s) in the sentiment series, the frequency series contains a point (t, f) where f is the number of points in the sentiment series in the time range [t−w, t], divided by w. This number f is called frequency.

Formally, $$f(t) = \frac{\#(s_s \cap [t-w, t])}{w}$$

$$s_f = \{(t, f(t)) \mid t \in V_1(s_s)\}$$

A pattern P is defined as a cross-correlation c in [−1,1], a positive window size w, a time lag l, and a time $t_s$. These numbers are interpreted as "the predictive series over [$t_s$−w, $t_s$] correlates to the target series over [$t_s$−w+l, $t_s$+l] with a cross-correlation of c".

Formally, a pattern is thus an element of $[-1,1] \times \mathbb{R}_+^* \times \mathbb{R} \times \mathbb{R}$ If the lag is positive, it is said to be predictive. The cross-correlation determines the relevance of the pattern: the higher it is, the more relevant the pattern is considered.

Pattern Identification Method

The method is called the sentiment-frequency method. It uses the sentiment to create a sentiment-frequency series, and correlates the latter to the target using a plain statistical cross-correlation. It then identifies patterns by finding the optimal time lag.

Correlating two time-series using a plain statistical cross-correlation and finding the optimal lag is an independent component. This component is called the series correlator and is described below.

Sentiment-Frequency Method

The system first creates an average sentiment series $s_a$ such that for every point (t,s) in the sentiment time series $s_s$ there is a point (t, a) in the average sentiment series where a is the arithmetic average of all the sentiments in the time range, or interval [t−w, t].

Formally let, $$A_w : t \in \mathbb{R} \mapsto \frac{\sum_{(t,s) \in s_s \cap [t-w,t]} s}{\#(s_s \cap [t-w,t])}$$

$$s_a = \{(t, A_w(t)) \mid t \in V_1(s_s \cap [t-w,t])\}$$

The system then creates the sentiment-frequency series $s_{sf}$ to contain a point $(t, v_{sf})$ for every (t,a) in the sentiment series and (t,f) in the frequency time series $s_f$, where $v_{sf} = f^a$ ($= e^{a \ln(f)}$).

Formally define as:

$$s_{sf} = \{(t, f^a) \mid (t,a) \in s_a, (t,f) \in s_f\}$$

Next the series correlator is applied to the sentiment-frequency series and the target.

Series Correlator

The series correlator produces a set of patterns based on a real-valued pulsated time series $s_p$, a real-valued sampled time series $s_s$, an interpolation method I for $s_s$, and a window size w.

The interpolation method I, is a function of a time series $s_s$ and of a time t that is $C^1$-piecewise continuous with respect to t, and such that if there exists a point (t,v) in $s_s$, $I(s_s, t) = v$. Interpolation is a classical subject and it will not be described here. Common interpolation methods are linear or cubic splines.

Formally, $$I \in T_s \to > C^1 \mathbb{R} \to \mathbb{R}$$

$$\forall (t,v) \in s_s, I(s_s, t) = v$$

For any time t and lag l, we defined the vector $E_s(s_s, s_p, t, l)$ so that for every $(t_p, p)$ in $s_p$ with $t_p$ in [t−w,t], $E_s(s_s, s_p, t, l)$ contains the point $I(s_s, t_p + l)$. We call $E_s(s_s, s_p, t, l)$ the interpolated.

Formally, $$E_s(s_s, s_p, t, l) = I(s_s, V_1(s_p \cap [t-w,t])_i + l)$$

The system also defines the vector $E_p(s_p, t)$ so that for every $(t_p, p)$ in $s_p$ with $t_p$ in [t−w,t], $E_p(s_p, t)$ contains the point p.

Formally, $$E_p = V_2(s_p \cap [t-w,t])$$

The cross-correlation $CC(s_s, s_p, t, l)$ is defined as the scalar product of $E_p(s_p, t)$ and $E_s(s_s, s_p, t, l)$ divided by the product of their norms.

Formally, $$\frac{\langle E_p(s_p, t) \mid E_s(s_s, s_p, t, l) \rangle}{\|E_p(s_p, t)\| \|E_s(s_s, s_p, t, l)\|}$$

Since $t \mapsto I(s_s, t)$ is $C^1$-piecewise continuous, for any fixed t, $CC(s_s, s_p, t, l)$ has a finite set of local maximums. There are many methods to find local maximums. One possible method is to use a gradient method on points spread evenly on the time interval that the series covers.

From the definition above, the local maximums of $CC_t : l \in \mathbb{R} \mapsto CC(s_s, s_p, t, l)$ simply move linearly with t when no points of $s_p$ leaves or enters [t−w,t]. Hence the sets of local maximums of $CC_t$ for t or (t−w) the time of a point in $s_p$ is a finite set that represents completely the set of local maximums of $CC_t$ for all t.

For every w, the system computes a finite set of times t and lags l and a cross-correlation c for each of them. This defines a finite set of patterns (c, w, t, l) which the system orders by relevance.

Real-Time Target Prediction

The system runs the previous algorithm for t=now. The system then chooses the one with the most relevant predictive lag, and project that the target will behave like the sentiment-frequency curve.

When applied to real-time several optimizations are made:

Non-predictive lags can be ignored (we don't have data on the target in the future)

The system only computes new local maximums when a new point arrives in the sentiment series.

Updating the cross-correlation series can be optimized, not all the scalar products have to be recomputed.

The system can reuse the local maximums we had already identified to find the new ones.

In summary, the system for sentiment, intensity cross-correlation provides for time-based cross-correlation between the real-time sentiment value and frequency of a message stream relative to an object and a quantifiable property of that object. The time correlation relates patterns in the sentiment and frequency to patterns in the object property. The cross-correlation system further includes graphical depictions showing relations identified by the patterns between the object property and the sentiment, frequency, and any quantity derived from them. The cross-correlation system also includes event prediction of future up and down movement of the object property based upon the aforementioned patterns, as well as trading signals generated on and trading strategies based on the aforementioned patterns.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A computer implemented system for generating data from social media messages of at most 140 characters for the real-time evaluation of publicly traded equities or commodities, comprising:
   an ingest component in the form of a computer for ingesting social media messages of at most 140 characters:
   a filter module of the computer eliminating expressions not considered useful language from social media messages and configuring input social media messages into useful formats to form filtered social media messages, wherein the filter module eliminates URLs and hash tags from the social media messages;
   a language processor of the computer processing the filtered social media messages based upon lexical databases to form filtered and processed social media messages, wherein the language processor includes a stock-based lexical repository composed of lexical items used in the ingested social media messages, as well as lexical items used in stock exchange and financial news wire, wherein the lexical items of the stock-based lexical repository are associated with specific polarity and strength values;

a sentiment calculator of the computer applying rules based upon the association of the lexical items of the stock-based lexical repository with specific polarity and strength values to the filtered and processed social media messages so as to compute a representation of sentiment values associated with the social media messages as they relate to the publicly traded equities or commodities, wherein the rules are applied in head-complement, modifier-modified, and subject- predicate relations to pairs of the lexical items in their local syntactic context based upon the specific polarity and strength value of the lexical items; and a computer monitor having a graphical user interface displaying the sentiment values as they relate to the publicly traded equities or commodities, wherein the publicly traded equities or commodities are represented as graphic objects which change in size and color to depict sentiment as a function of intensity and polarity.

2. The computer implemented system according to claim 1, wherein the ingest component acquires social media messages on the basis of keywords or a combination of keywords the ingest component has been programmed to look for.

3. The computer implemented system according to claim 1, further including a language identifier positioned after the ingest component for determining the language used in the social media messages prior to the filter module.

4. The computer implemented system according to claim 1, wherein the language processor includes a sentiment-based repository of frequent lexical items.

5. The computer implemented system according to claim 4, wherein the lexical items are associated with polarity values and strength values.

6. The computer implemented system according to claim 5, wherein the polarity values are positive, negative and neutral.

7. The computer implemented system according to claim 5, wherein the strength values associated with the lexical items range from at least 1 to 3, where 1 is the lowest value and 3 is the highest value.

8. The computer implemented system according to claim 4, wherein the lexical items of the stock-based lexical repository are associated with polarity values and strength values and wherein the lexical items of the sentiment-based lexical repository are associated with polarity values and strength values.

9. The computer implemented system according to claim 8, wherein the polarity values of the lexical items of the stock-based lexical repository are positive, negative and neutral and wherein the polarity values of the lexical items of the sentiment-based lexical repository are positive, negative and neutral.

10. The computer implemented system according to claim 8, wherein the strength values associated with the lexical items of the stock-based lexical repository ranges from at least 1 to 3, where 1 is the lowest value and 3 is the highest value and wherein the strength values associated to the lexical items of the sentiment-based lexical repository ranges from at least 1 to 3, where 1 is the lowest value and 3 is the highest value.

11. The computer implemented system according to claim 1, wherein the language processor includes a POS tagger.

12. The computer implemented system according to claim 1, wherein the polarity values are positive, negative and neutral.

13. The computer implemented system according to claim 1, wherein the language processor includes a parser.

14. The computer implemented system according to claim 1, wherein a sentiment is an integer computed based upon pairs of lexical items in local syntactic context.

15. The computer implemented system according to claim 1, further including an inference engine attempting to provide an answer to a problem, or clarifying uncertainties.

16. The computer implemented system according to claim 15, wherein the inference engine includes a data structure, a knowledge base that uses some knowledge representation structure to capture the knowledge of a specific domain, and a set of inference rules applying to the entities in the relational table and drawing consequences.

17. The computer implemented system according to claim 1, wherein the language processor includes a lemmatizer.

18. The computer implemented system according to claim 1, wherein the language processor includes a part of speech tagger assigning lexical categories to each of the filtered social media messages, a partial parser recovering the structure of syntactic structures of the filtered social media messages, and a lemmatizer reducing the spelling of words of the filtered social media messages to their lexical root.

* * * * *